A. C. LONG.
FRICTIONAL GEARING.
APPLICATION FILED APR. 6, 1910.
987,308.
Patented Mar. 21, 1911.
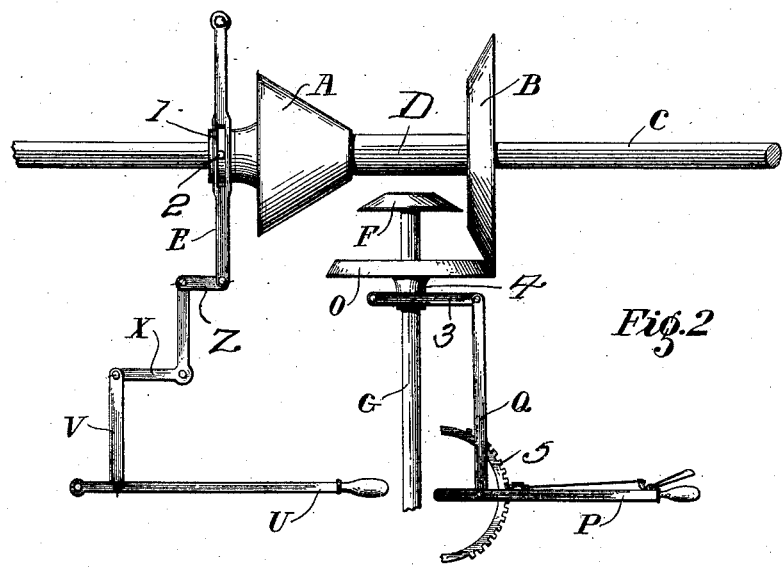
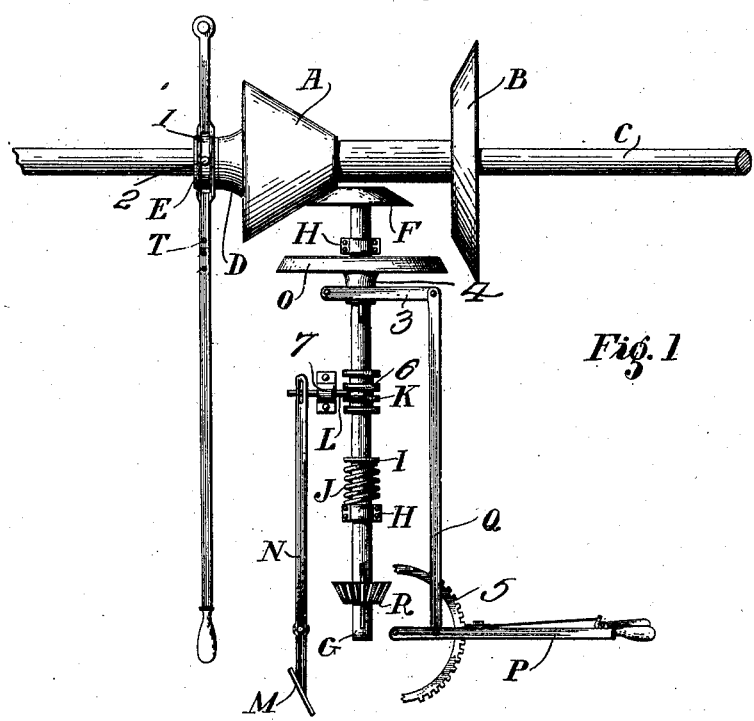

UNITED STATES PATENT OFFICE.

ANDREW C. LONG, OF YORK, PENNSYLVANIA.

FRICTIONAL GEARING.

987,308. Specification of Letters Patent. Patented Mar. 21, 1911.

Application filed April 6, 1910. Serial No. 553,896.

*To all whom it may concern:*

Be it known that I, ANDREW C. LONG, a citizen of the United States, residing at York, in the county of York and State of Pennsylvania, have invented a new and useful Frictional Gearing, of which the following is a specification.

The present invention comprehends certain new and useful improvements in frictional gearing, and the object of the invention is a gearing of this character which is quite simple, durable and efficient, and which is designed particularly for use in connection with saw mill feeds, although not limited to any such use.

Another object of the invention is an improved gearing in which the gears may be easily and quickly adjusted to vary the speed or reverse the motion of the driven shaft, according as desired.

With these and other objects in view that will more fully appear as the description proceeds, the invention consists in certain constructions and arrangements of the parts that I shall hereinafter fully describe and then point out the novel features of in the appended claims.

For a full understanding of the invention and the merits thereof and also to acquire a knowledge of the details of construction, reference is to be had to the following description and accompanying drawing, in which:

Figure 1 is a plan view illustrating the gearing constructed in accordance with my invention; and, Fig. 2 is a similar view showing another embodiment of the invention.

Corresponding and like parts are referred to in the following description and indicated in all the views of the drawing by the same reference characters.

Referring to the drawing, the reference character C designates the drive shaft on which is fitted a sleeve D. Two beveled friction-gears A and B are carried by and rigid with the sleeve at longitudinally spaced points, the gears tapering toward each other. The peripheral width of the gear A is considerably greater than that of the gear B, while the gear B is of greater diameter than the gear A and is beveled at a greater angle than the same.

The sleeve D is splined on the drive shaft in order to rotate therewith and to be slidable longitudinally thereon. The longitudinal adjustment of the sleeve is effected through the instrumentality of a lever E which is suitably fulcrumed at one end and which is formed intermediate of its ends with a slot 1 in which operates a pin 2 outstanding from the sleeve. The lever is operated by an extension handle S that is bolted or otherwise detachably secured to the free end thereof, as indicated at T.

The driven shaft G is disposed substantially perpendicularly to the drive shaft and is journaled in a plurality of suitable bearings H. Beveled friction-gears F and O are mounted on the driven shaft between the gears A and B. The gears F and O are preferably provided with paper covered peripheries. The gear F is of less diameter than the gear O and is fixed on the extremity of the driven shaft adjacent to the drive shaft, said gear being suitably beveled for engagement with the gear A.

The gear O is beveled for engagement with the the gear B and is splined on the driven shaft so as to be adjustable longitudinally thereon. As the preferred means for shifting this gear I provide a yoke lever 3 which engages the hub 4 thereof, a link Q connecting the yoke lever with a hand lever P. The hand lever is latched to a segment 5 in order to hold the gear O in different adjusted positions.

The driven shaft G is slidable in the bearings H and is pressed longitudinally toward the drive shaft C by means of a coil expansion spring J, the spring encircling the shaft and being interposed between one of the bearings H and a collar I fixed on the shaft. A collar K is also fixed on the shaft and is formed in its periphery with a plurality of grooves 6 in any selected one of which a latch L may be seated to lock the shaft against sliding movement. The grooves have an annular contour so as to provide a continuous passage for the latch and to prevent the same from interfering with the free rotation of the driven shaft. The latch is mounted in a suitable bearing 7 and is normally held out of engagement with the collar K. One arm of a lever N has a pin and slot connection with the latch, while the other arm of this lever preferably carries a pedal M which is designed to receive pressure to rock the lever and insert the latch in one of the grooves.

A bevel pinion R is splined on the shaft G to transmit rotary movement therefrom to the feed mechanism of the saw mill (not shown). The pinion is held in any suitable manner against movement in the direction of the driven shaft, the driven shaft sliding through the pinion during its longitudinal movement in the bearings H.

In the practical operation of the invention, the lever E is shifted to slide the sleeve D on the shaft to move the friction gear A toward and into engagement with the gear F, the parts assuming the positions illustrated in Fig. 1 with the gear B placed apart from both driven gears F and O. The spring J holds the gear F firmly against the gear A so that rotary movement is transmitted from the shaft C to the shaft G. By shifting the sleeve still farther in the same direction, the shaft G is slid longitudinally away from the drive shaft and against the force of the spring J. As the peripheral width of the gear A is considerably greater than that of the gear F, this additional movement causes the gear A to engage with the gear F nearer its larger end, whereby to increase the speed of rotation of the driven shaft. Therefore, the variation of the speed of the driven shaft may be conveniently effected by merely shifting the lever E to change the relative positions of the gears A and F. When it is desired to maintain a constant speed, the latch L is seated in one of the grooves 6 to lock the driven shaft against longitudinal movement and prevent the said gears from being adjusted to different operative positions. To reverse the motion of the driven shaft the lever E is locked to slide the sleeve to the position illustrated in Fig. 2, in which the gear A is spaced apart from the gear F while the gear B is engaged with the gear O. The lever P is shifted with respect to the segment 5 to slide the gear O on the driven shaft to adjust said gear relatively to the gear B. The peripheral width of the gear B is greater than that of the gear O and hence this adjustment causes a variation of the speed.

Fig. 2 shows another embodiment of the invention wherein the extension handle S is omitted. In this instance the free end of the lever E is connected by a link Z to one arm of an elbow lever X. A link V connects the other arm of the elbow lever to a hand lever W.

Having thus described the invention, what I claim is:

1. The combination of bevel drive and driven gears, means for adjusting one of said gears relatively to the other gear to vary the speed, means for continuously urging the other gear toward and into engagement with the adjustable gear, and means for locking said other gear against movement under the influence of the urging means, to maintain a constant speed.

2. The combination of bevel drive and driven gears, means for adjusting one of said gears relatively to the other gear to vary the speed, means for permitting the other gear to yield to compensate for said adjustment, and means for locking the last-named gear against yielding movement to maintain a constant speed.

3. The combination of drive and driven shafts, bevel gears carried by the shafts, means for adjusting the gear on one of the shafts to vary the speed, means for continuously urging the other shaft in one direction to maintain said gears in engagement, and means for engaging the last-named shaft to hold the same against movement under the influence of the urging means, to maintain a constant speed.

4. The combination of drive and driven shafts, bevel gears carried by the shafts, means for adjusting the gear on one of the shafts, a spring for yieldingly and continuously urging the other shaft axially in one direction to maintain the gears in engagement, and means for engaging the last-named shaft to hold the same against axial movement in both directions, to maintain a constant speed.

5. The combination of drive and driven shafts, bevel gears carried by the shafts, means for adjusting the gear on one of the shafts to vary the speed, means for continuously urging the other shaft axially in one direction to maintain said gears in engagement, the last-named shaft being provided with a continuous transverse groove, and a latch adapted to be inserted in said groove to lock the shaft against movement under the influence of the urging means.

6. The combination with bevel drive and driven gears, of means for adjusting one of said gears relatively to the other to vary the speed, means for continuously urging the other gear toward and into engagement with the adjustable gear, and means for locking said other gear against movement under the influence of the urging means, to maintain a constant speed, said locking means including a collar rotatable with the last-named gear and having a continuous peripheral groove, and a latch adapted to be engaged in the groove.

7. The combination with bevel drive and driven gears, of means for adjusting one of said gears relatively to the companion gear to vary the speed, means for continuously urging one of the gears toward and into engagement with the other gear, and means for locking the last-named gear against movement under the influence of the urging means, to maintain a constant speed.

ANDREW C. LONG.

Witnesses:
GEORGE L. STOUCH,
HENRY A. ZIEGLER.

---

Copies of this patent may be obtained for five cents each, by addressing the "Commissioner of Patents, Washington, D. C."